(12) United States Patent
Vander Lind et al.

(10) Patent No.: US 8,955,795 B2
(45) Date of Patent: Feb. 17, 2015

(54) MOTOR PYLONS FOR A KITE AND AIRBORNE POWER GENERATION SYSTEM USING SAME

(71) Applicant: Google Inc., Mountain View, CA (US)

(72) Inventors: Damon Vander Lind, Oakland, CA (US); Pranay Sinha, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 13/733,125

(22) Filed: Jan. 2, 2013

(65) Prior Publication Data
US 2013/0221154 A1   Aug. 29, 2013

Related U.S. Application Data (60) Provisional application No. 61/582,408, filed on Jan. 2, 2012.

(51) Int. Cl.
| B64D 27/02 | (2006.01) |
| B64D 27/26 | (2006.01) |
| B64C 31/06 | (2006.01) |
| B64D 27/24 | (2006.01) |
| F03D 5/00 | (2006.01) |

(52) U.S. Cl.
CPC ............... B64D 27/26 (2013.01); B64C 31/06 (2013.01); B64D 27/24 (2013.01); F03D 5/00 (2013.01); Y02T 50/62 (2013.01); Y02E 10/70 (2013.01)
USPC ........................... 244/54; 244/34 R; 244/154

(58) Field of Classification Search
USPC ........ 244/34 R, 35 R, 36, 37, 54, 198, 153 A, 244/153 R, 154, 155 A, 155 R; 290/44, 55
See application file for complete search history.

(56) References Cited

U.S. PATENT DOCUMENTS

| 2,914,014 | A | * | 11/1959 | Carl et al. ..................... 114/281 |
| 4,601,442 | A | | 7/1986 | Friedel et al. |
| 2007/0029440 | A1 | | 2/2007 | Shepshelovich et al. |
| 2009/0261198 | A1 | * | 10/2009 | Bonnaud et al. ................. 244/54 |
| 2010/0013226 | A1 | | 1/2010 | Blumer et al. |
| 2010/0025526 | A1 | | 2/2010 | Lawrence |
| 2010/0026007 | A1 | | 2/2010 | Bevirt |
| 2010/0032947 | A1 | | 2/2010 | Bevirt |
| 2010/0032948 | A1 | | 2/2010 | Bevirt |
| 2010/0065691 | A1 | | 3/2010 | Droney |
| 2010/0221112 | A1 | | 9/2010 | Bevirt et al. |
| 2010/0230546 | A1 | | 9/2010 | Bevirt et al. |
| 2010/0283253 | A1 | | 11/2010 | Bevirt |

(Continued)

OTHER PUBLICATIONS

International Search Report prepared by the US Patent Office in International Patent Application PCT/US2013/028120, mailed Jun. 14, 2013.

*Primary Examiner* — Philip J Bonzell
*Assistant Examiner* — Nicholas McFall
(74) *Attorney, Agent, or Firm* — McDonnell Boehnen Hulbert & Berghoff LLP (57) ABSTRACT

A motor pylon system adapted for use with an airborne power generations system is disclosed. The pylons may support turbine driven generators for wind based electrical power generation which also function as electric motors in some aspects. The pylons may be designed to provide side force useful for turning a tethered flying wing flying in a circular cross wind flight path. The pylons may be designed to minimize air flow disruptions over the main wing.

20 Claims, 10 Drawing Sheets

(56) References Cited

U.S. PATENT DOCUMENTS

| | | |
|---|---|---|
| 2010/0295320 A1 | 11/2010 | Bevirt |
| 2010/0295321 A1 | 11/2010 | Bevirt |
| 2011/0042508 A1 | 2/2011 | Bevirt et al. |
| 2011/0042509 A1 | 2/2011 | Bevirt et al. |
| 2011/0042510 A1 | 2/2011 | Bevirt et al. |
| 2011/0121570 A1 | 5/2011 | Bevirt et al. |
| 2011/0127775 A1 | 6/2011 | Bevirt |
| 2011/0260462 A1* | 10/2011 | Vander Lind ................... 290/55 |
| 2011/0266395 A1 | 11/2011 | Bevirt |
| 2012/0286102 A1 | 11/2012 | Sinha et al. |
| 2012/0287274 A1 | 11/2012 | Bevirt |

\* cited by examiner

MOTOR PYLONS FOR A KITE AND AIRBORNE POWER GENERATION SYSTEM USING SAME

CROSS REFERENCE TO RELATED APPLICATIONS

This application claims priority to U.S. Provisional Patent Application No. 61/582,408 to Vander Lind et al., filed Jan. 2, 2012, which is hereby incorporated by reference in its entirety.

STATEMENT REGARDING FEDERALLY SPONSORED RESEARCH OR DEVELOPMENT

This invention was made with government support under Contract Numbers DE-AR0000122/AR0000243 awarded by Advanced Research Projects Agency-Energy (ARPA-E). The government has certain rights in the invention.

BACKGROUND

1. Field of the Invention

The present invention relates to a system and method of flying tethered flying vehicles.

2. Description of Related Art

Crosswind kite systems comprising tethered wings (kites) can extract useful power from the wind for purposes such as, for example, generating electricity, lifting or towing objects or vehicles, etc. To provide or use consistent power, it may be desired to fly the kite in repeating trajectories (i.e., a limit cycle). It may also be desired to maintain the kite aloft and flying consistent trajectories during a large range of environmental conditions such as high wind speeds, large gusts, turbulent air, or variable wind conditions. However, take-off and landing of such kites can present difficulties, as the kites may not be well adapted for landings similar to that of an aircraft. Therefore, a mode of operation is desired so that a kite system can take-off, land, and operate safely in high and changing winds.

SUMMARY OF THE INVENTION

A motor pylon system adapted for use with an airborne power generations system is disclosed. The pylons may support turbine driven generators for wind based electrical power generation which also function as electric motors in some aspects. The pylons may be designed to provide side force useful for turning a tethered flying wing flying in a circular cross wind flight path. The pylons may be designed to minimize air flow disruptions over the main wing.

DETAILED DESCRIPTION

A motor pylon design for a kite system is disclosed. A kite system comprising motors or motor/generators may be used for a number of purposes. For example, a kite system comprising rotors and motor/generators might be used for extraction of power from the wind, might be used for towing of a vehicle, might be used for surveillance, or might be used as a communications relay. A kite system of this type can be launched and landed from a ground station in a hovering mode of flight, in which the kite hovers under thrust from on-board rotors, while the tether attaching the kite is reeled in or out from the ground station. The on-board rotors, as referred to herein, may be adapted for dual function. When providing thrust, the rotors are viewed as motor driven propellers. When being used to convert wind energy into electrical energy, the rotors are viewed as turbine driven generators. When operating, the kite either flies stationary in the wind, in the matter of a traditional kite, or flies in a crosswind flight pattern along a flightpath, generally at a speed which is a high multiple of the ambient wind speed. When flying in a crosswind flight pattern, the stability, controllability, and balance of forces on the kite system are substantially improved by use of a tail, much in the manner of a traditional aircraft. In some embodiments, the kite system is used to generate power in the crosswind mode of flight, and onboard rotors which are used to provide thrust during takeoff and landing, or during lulls in wind are operated at a lower RPM and used to turn the motor/generators to produce power. There is a strong incentive to make the main wing of such systems operate at a high coefficient of lift and have a high aspect ratio, as the performance of the system is described by the simplified performance metric P:

P is proportional to $CL^3/CD^2$. (where Cl is the coefficient of lift and CD is the coefficient of drag)

In order to have pitch control in hover through changes in thrust on the various rotors, and in order to keep the wake of the rotors off the main wing, thereby reducing disturbances to flow over the main wing which may reduce coefficient of lift, the rotors and motor/generators are placed substantially above and below the main wing. In addition, to counter the mass of the tail, which is desired for stability in flight, and to reduce the impact of flow over the main wing on the pressure distribution across the swept area of the rotors, the rotors and motor/generators are located substantially in front of the main wing. Additionally, it is desirable to generate a variable level of side (lateral or along-span) aerodynamic force with the kite in order to counter the gravitational, centripetal, and aerodynamic forces causing the kite to deviate from the desired flightpath. It may be desirable to use the area of the vertical sides of the pylons in order to generate a component of the force required to turn the wing when flying in substantially circular flight paths, and thus to allow the wing to operate at variable levels of sideslip. Aspects of this type of operation are seen in U.S. patent application Ser. No. 13/288,527 to Vander Lind, which is hereby incorporated by reference in its entirety. In some embodiments of the present invention is a design for a motor pylon which does not interfere with the lift-generating capacity of the main wing of the kite, which integrates structurally with the main wing of the kite, which generates significant aerodynamic side-force, and which has these properties at varying angles of sideslip (e.g. from −5 to +5 degrees or from −10 to +10 degrees of sideslip).

In some aspects, the present invention comprises lower and upper pylon segments, connected by a blended joint. The lower pylon attaches to the lower surface of the main wing, while the upper pylon attaches to the upper surface of the lower pylon. The foremost attachment point of the upper pylon is near the leading edge stagnation point of the main wing, such that there is little interference between the pylon and the upper surface of the main wing. Furthermore, the blend from lower to upper pylon tapers to a narrow width, and the chord of the upper pylon is substantially smaller than the maximum chord of the lower pylon. References to the chord of the pylon refer to the length of the section in the yaw axis. In some embodiments, the blend between lower and upper pylons is contoured such that the mean streamlines about the main wing, when projected onto the surface of the pylon, follow smooth contours with decreasing curvature far from the leading edge of the pylon blend. In some embodiments, the blend between lower and upper pylons may be contoured such that the streamlines passing over the upper part of the lower pylon segment cross over to the upper surface of the main wing and flow at a small angle to streamlines passing over the upper pylon segment about the stagnation point on the main wing proximal to the pylon.

Figure 1:
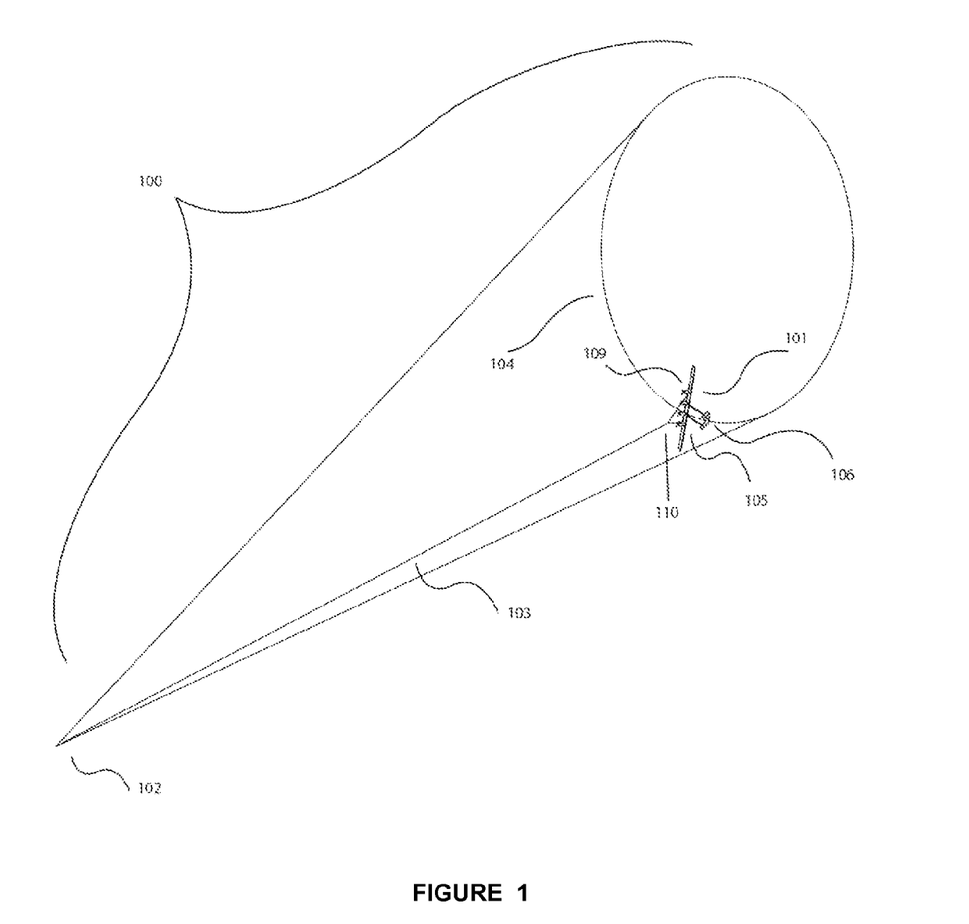
FIG. 1 illustrates a kite system flying according to some embodiments of the present invention.

FIG. 1 is a diagram depicting a kite system according to some embodiments of the present invention. A kite system 100 comprises a tether 103 that connects the kite 101 to the ground station 102. The kite 101 flies along the flightpath 104 at a high multiple of the speed of the wind 122 during normal operation in a cross wind flight path 104. In some embodiments, to launch and land, the kite 101 hovers under thrust from the rotors 109, which are controlled by an automatic control system. Aspects of the take-off and landing of the kite system may be seen in U.S. patent application Ser. No. 13/070,157 to Vander Lind, which is hereby incorporated by reference in its entirety. To provide pitch control authority, some of the rotors 109 are distributed above the center of gravity of the kite 101 and some are distributed below the center of gravity of the kite 101, as viewed in the typical aircraft build reference frame. In some embodiments, the tail 106 comprises a horizontal element which is located substantially above the kite center of gravity, and which rotates 90 degrees pitch down during hover, to both reduce the pitching moment on the kite 101 due to the wind 122 on the tail 106, and to stabilize the kite 101 in pitch. The kite 101 further comprises a main wing 105. In embodiments in which kite system 100 is used to generate power, the main wing 105 is used to generate substantial lift, such that the kinetic energy available in the wind is transferred into the kite 101 in the same manner as the tip of a wind turbine blade.

Figure 2:
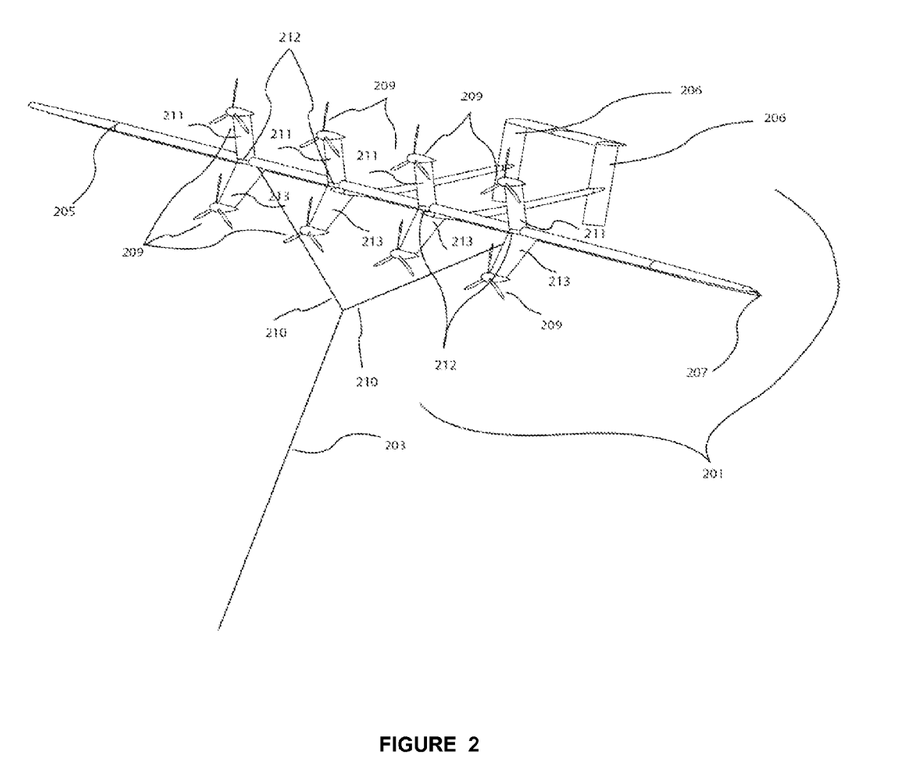
FIG. 2 illustrates a flying kite according to some embodiments of the present invention.

FIG. 2 is a diagram depicting an embodiment of a kite 201, such as a kite 101 comprised by the kite system 100 depicted in FIG. 1. The kite 201 comprises a main wing 205, which generates substantial lift during operation of the kite 201 along its flightpath (e.g. flightpath 104). In some embodiments, the main wing 205 comprises a trailing element 207 which increases the maximum coefficient of lift which may be generated by the main wing 205. The kite 201 further comprises a tail 206, which both counters the pitching moment generated by the main wing 205 and trailing element 207, and increases the pitch stability, yaw stability, and coupled stability of the kite 201. However, the tail 206 has mass, which suggests that, to locate the kite center of mass 223 at its target location near the quarter chord of the main wing 205, a countering mass must be located forward of wing 205. The rotors 209, along with the motor/generators which drive the rotors 209, are located in front of the main wing 205 such that their mass counters that of the tail 206. The rotors 209 and the associated motor/generators are attached to the wing through pylons 212. The pylons 212 comprise upper pylons 211 and lower pylons 213. As the main wing 205 may be operated at a high coefficient of lift, it is designed with a specific distribution of pressure along the chord of the wing 205 such that lift remains high, drag remains low, and the wing 205 does not prematurely stall. As the coefficient of pressure over the surface of the wing 205 derives from the shape of the wing 205, modifications of the wing 205 have the potential to change the pressure distribution and affect stall. Furthermore, as the coefficient of lift of the wing 205 may be high in some embodiments (e.g. above 0.7 as referenced to the wing area of the wing 205), air on the bottom surface of the wing 205 is moving slowly and has a lesser effect on the pressure distribution about the wing 205 due to shape changes. Thus, the lower pylon 213 attaches to the bottom surface of the wing 205 to take advantage of this lower sensitivity of the bottom surface of the wing to disturbance, and the upper pylon 211 attaches to the top of the lower pylon 213, as opposed to the top surface of the wing 205.

The kite 201 may operate for a long period of time. As such, the rotors 209, wing 205, tail 206, and motor pylons 212 must be subjected to low time varying aerodynamic stresses to reduce structural fatigue. The rotors 209 are located substantially in front of the wing 205 such that the change in pressure about the wing 205 as the wing 205 generates lift does not substantially impact the flow entering any portion of the swept area of the rotors 209. The rotors 209 are located substantially above and below the main wing 205 such that the wakes of the rotors 209 do not impinge on the main wing 205 during normal operation of the kite 201, thereby avoiding an increase in turbulence impinging on the wing 205.

Figure 3:
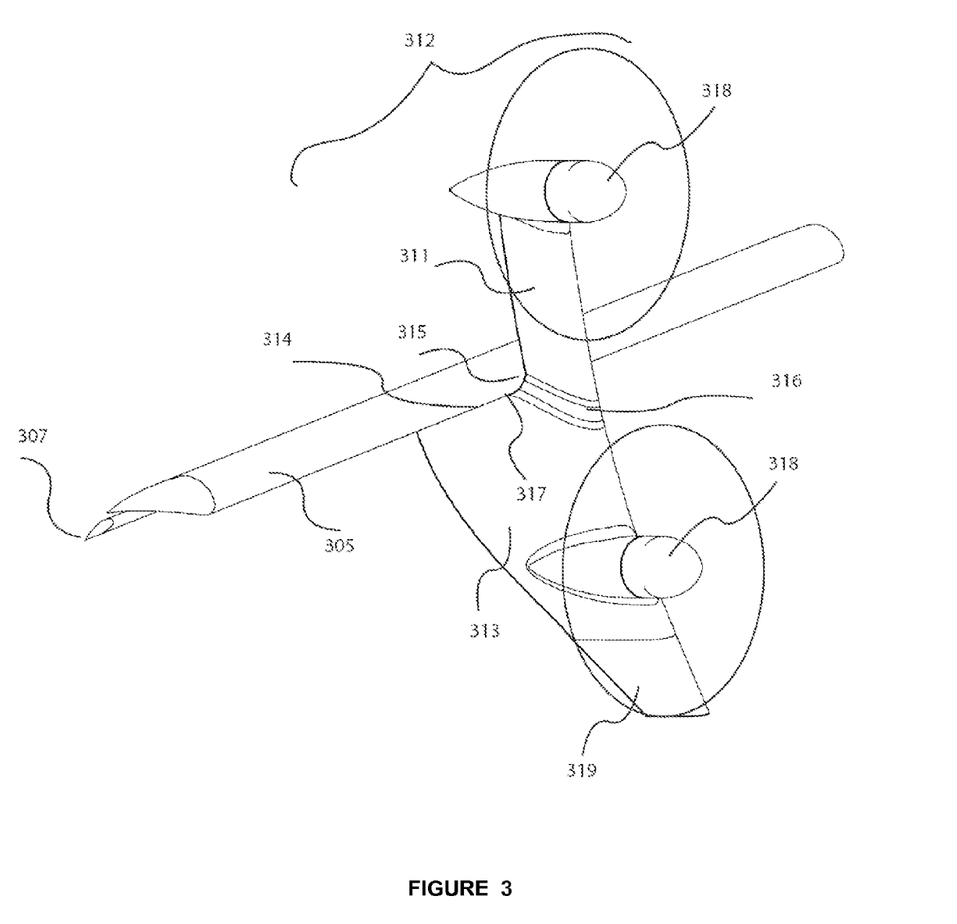
FIG. 3 illustrates a wing mounted pylon with turbine driven rotors mounted thereon according to some embodiments of the present invention.

FIG. 3 is a diagram a motor pylon 312 and the manner in which it is affixed to a main wing 305 according to some embodiments of the present invention. A lower pylon 313 is affixed to the lower surface 314 of the main wing 305, and an upper pylon 311 is affixed to the leading portion of the lower pylon 313. A junction 316 joining the upper pylon 311 and the lower pylon 313 is shaped to follow the mean streamlines over the wing 305 in the normal operating condition of the wing 305. In some embodiments, sharp corners along junction blends, such as the junction blend 317, are incorporated such that in normal operating conditions the defining contours of the junction blend 317 runs along the direction of mean flow during normal operating conditions, but at low angles of attack, flow crosses the junction blend 317 at an angle and, due to the sharpness of the junction blend 317, detaches or separates. In some embodiments, a sharp junction blend is incorporated to increase drag at low angles of attack, such that, in cases where the flight speed of the kite and tension on the tether 102 must be limited, the kite may produce increased drag at low angles of attack. Increased drag may be a desired characteristic when flying at high wind speeds.

In some embodiments, the pylon 312 comprises asymmetric, cambered airfoils oriented at some angle of inclination about the pylon span, relative to the mean oncoming flow direction. In such cases, the aerodynamic force generated by the pylons 312 produce a side force on the kite (e.g. kite 101), which accelerates the kite around its flightpath (e.g. flightpath 104). In some embodiments, the trailing edge of the pylon 312 extends behind the trailing edge of the main wing 305, and attaches to and supports the trailing elements 307. In some embodiments, just the lower pylon 313 extends beyond the trailing edge of the main wing 305. In the depicted embodiment, the pylon 313 comprises an airfoil with thickness of 15 percent of local chord, and camber of 4 percent of local chord, and is rotated six degrees relative to the design oncoming flow case. Thus, the pylon 312 generates a side force during the normal flight condition of the kite. The upper pylon 311 is also cambered 4 percent of chord, but is only inclined 3 degrees from the typical oncoming flow. As a strong wake from the upper pylon 311 would have the potential to impact the attachment of flow on the upper surface of the wing 307, the upper pylon is both smaller in chord and inclined at a lower angle than the lower pylon 313, such that the upper pylon 311 contributes a smaller portion of the side force than the lower pylon 313.

Junction 316 tapers from a wider cross-section at the top of the lower pylon 313 to a smaller cross-section with a pointed trailing tip 315 at the bottom of the upper pylon 311. The pointed tip 315 is located near the leading edge of the main wing 305, and the upper pylon 311 does not attach to the wing 305 over a large portion of the upper surface of the wing 305. In some embodiments, the pointed tip 315 is located at or near the stagnation point of the wing 305 during normal flight conditions. The stagnation point, of the point of flow stagnation on the leading edge of the wing 305 moves as the angle of attack of the wing 305 changes.

In some embodiments, a landing gear extension 319 extends below the bottom of the lower pylon 313, such that landing gear may attach to the bottom of the pylon 312 and clear the rotors for landing, with tether detached, in the manner of an aircraft. Aircraft type landing gear of this type are used in some embodiments which land in the manner of an aircraft in the event of a rotor, motor/generator, or power systems failure.

Figure 4:
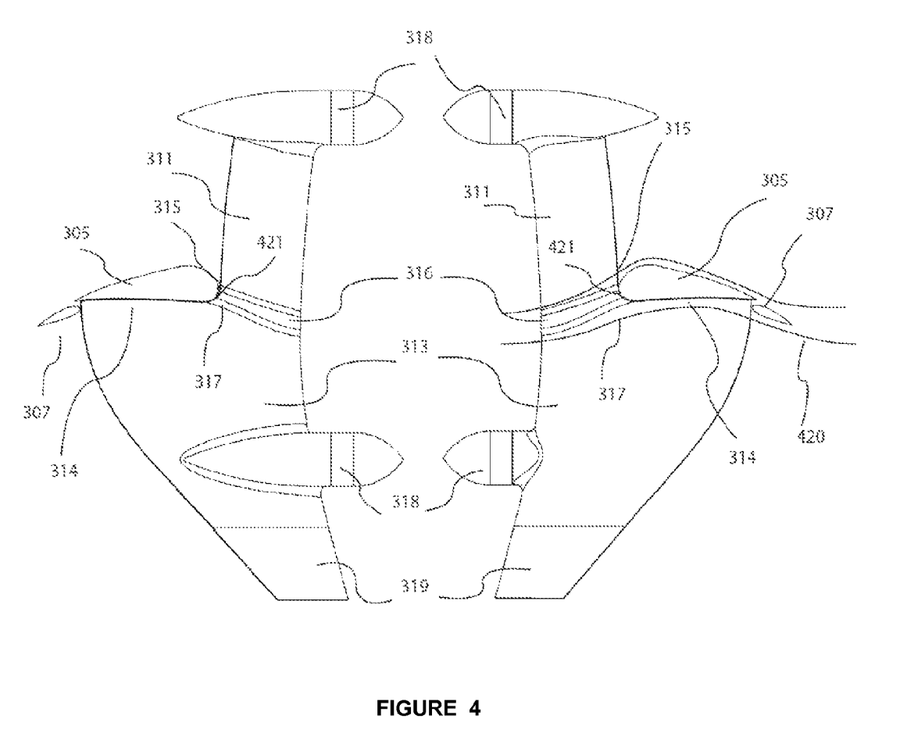
FIG. 4 illustrates a pylon with turbine driven rotors mounted thereon according to some embodiments of the present invention.

FIG. 4 is a diagram depicting a motor pylon 312, the manner in which the motor pylon 312 is affixed to the main wing 305, and the manner in which the motors and/or generators 318 are attached to the upper pylon 311 and the lower pylon 313 according to some embodiments of the present invention. The lower pylon 313 is affixed to the lower surface 314 of the main wing 305, and the upper pylon 311 is affixed to the leading portion of the lower pylon 313. The junction 316 is shaped to follow the mean streamlines 420 under the wing 305 in the normal operating condition of the wing 305, which are seen below the stagnation point 421.

In some embodiments, the pylon 312 comprises an asymmetric, cambered airfoil mounted at some angle of inclination relative to the pylon span (angle of sideslip relative to the main wing, such that the pylon 312 is, in normal operation, generating lift primarily in the same direction in at all pointe around the flightpath. In such cases, the aerodynamic force generated by the pylons 312 produces a side force on the kite (e.g. kite 101), which accelerates the kite around its flightpath (e.g. flightpath 104) when flying in a circular flight path, for example. In the depicted embodiment, the upper pylon 313 comprises an airfoil with thickness of 15 percent of local chord, and camber of four percent of local chord, and is rotated six degrees relative to the design oncoming flow case. Thus, the pylon 312 generates a side force during the normal flight condition of the kite. In such embodiments, air on the pressure surface of the lower pylon 313 is moving slowly and has a lesser effect on the pressure distribution about the lower pylon 313 due to shape changes. The pressure surface is what would be viewed as the bottom of an airfoil in a horizontal configuration. Thus, the motor/generator 318 attaches to the pressure surface of the pylon 313 and may protrude onto the other (suction) surface of the pylon 312 to a lesser extent. The motor/generator 318 is oriented such that its rotation axis is parallel to the oncoming airflow and the disc of any propeller 309 attached to the motor/generator 318 is roughly normal to the oncoming airflow.

In some embodiments, the upper pylon 311 is also cambered 4 percent of chord, but is only inclined 3 degrees from the typical oncoming flow. As a strong wake from the upper pylon 311 would have the potential to impact the attachment of flow on the upper surface of the wing 305, the upper pylon 311 is both smaller in chord and inclined at a lower angle than the lower pylon 313, such that the upper pylon 311 contributes a smaller portion of the side force than the lower pylon 313, and the pylon junction 316 tapers from a wider cross-section at the top of the lower pylon 313 to a smaller cross-section with a pointed tip at the trailing edge attachment point 315, at the bottom of the upper pylon 311. In such embodiments, air on the pressure surface (the surface toward the direction of the sideforce) of the upper pylon 311 is moving slowly and has a lesser effect on the pressure distribution about the upper pylon 311 due to shape changes. However, the upper pylon 311 is much thinner and has a significantly smaller chord than the lower pylon 313, thus has less space for attachment of the motor/generator 318 on any pressure or suction surface. Thus, the motor/generator 318 attaches to the top surface of the pylon 311, thereby reducing airflow interference and potentially increasing sideforce capability. The trailing edge attachment point 315 is located near the leading edge of the main wing 305, and the upper pylon 311 does not attach to the wing 305 over a large portion of the upper surface of the wing 305. In some embodiments, the trailing edge attachment point 315 is located at or near the stagnation point of wing 305 during normal flight conditions. The motor/generator 318 is oriented such that its rotation axis is parallel to the oncoming airflow and the disc of any propeller 309 attached to the motor/generator 318 is roughly normal to the oncoming airflow.

In some embodiments, the pylon 312 comprises symmetric, uncambered airfoils mounted at zero angle of sideslip relative to the mean oncoming flow direction. In such cases, no aerodynamic side force is generated by the pylons 312 on the kite (e.g. kite 101). In such embodiments, the motor/generator 318 may be mounted such that its cowling may protrude on both surfaces of the upper pylon 311 and/or the lower pylon 313 equally or unequally.

Figure 5:
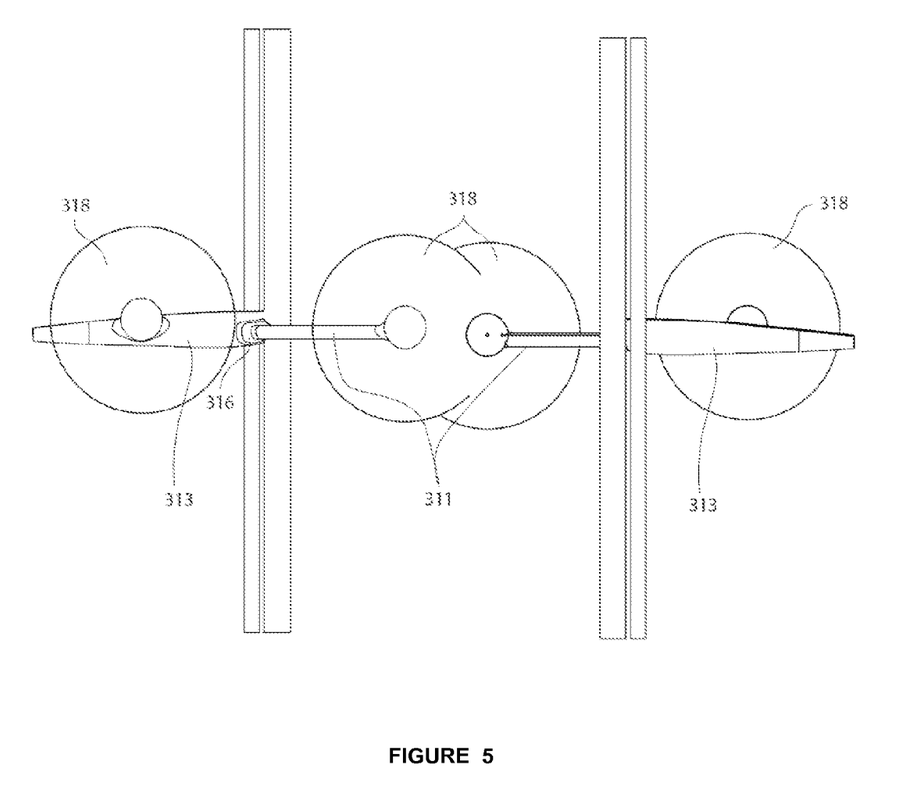
FIG. 5 illustrates the relative locations of rotor axes and rotor mounting according to some embodiments of the present invention.

FIG. 5 is a diagram depicting an embodiment of a motor pylon 312, the manner in which it is affixed to a main wing 305, the manner in which the motors and/or generators 318 are attached to the upper pylon 311 and the lower pylon 313, and the manner in which the upper pylon 311 is attached to the lower pylon 313. The lower pylon 313 is affixed to the lower surface 314 of the main wing 305, and the upper pylon 311 is affixed to the leading portion of the lower pylon 313. The upper-to lower pylon junction 316 is shaped to follow the mean streamlines (e.g. streamlines 420) over the wing 305 in the normal operating condition of the wing 305. In the depicted embodiment, the upper pylon 311 is thinner than the lower pylon 313 and the junction 316 tapers to a smaller width from the lower pylon to the upper pylon. In such embodiments, the upper pylon may be laterally offset from the centerline of the lower pylon 313, such that the suction surfaces on the upper pylon 311 and the lower pylon 313 are closely aligned to follow the natural streamlines (e.g. streamlines 420) of oncoming airflow, or such that any spar or structural element may be correctly positioned.

In some embodiments, the motor/generator 318 mounted on the upper pylon 311 may be offset towards the pressure surface potentially minimizing any loss of sideforce due to interference with higher speed airflow on the suction surface which is more susceptible to separation and loss of attachment than the lower speed airflow over the pressure surface. In some embodiments, the motor/generator 318 mounted on the lower pylon 313 may be offset towards the pressure surface potentially minimizing any loss of sideforce due to interference with higher speed airflow on the suction surface which is more susceptible to separation and loss of attachment than the lower speed airflow over the pressure surface.

In the depicted embodiment, the majority of the sideforce exerted on the kite (e.g. kite 101) by the pylons 312 is provided by the lower pylon 313. In such embodiments, the placement of the motor/generator 318 is more critical for the lower pylon 313. In such cases, the lateral placement of the motor/generator 318 on the upper pylon 311 may be such that it is at the same spanwise location along the main wing 305 as the motor/generator 318 on the lower pylon 313. This reduces angular accelerations of the kite (e.g. 101) along axes other than those specifically intended, in case the motor/generators 318 are used for attitude control by changing the thrust or drag or torque to different extents for the motor/generators 318 at various positions relative to the kite's center of mass.

Figure 6:
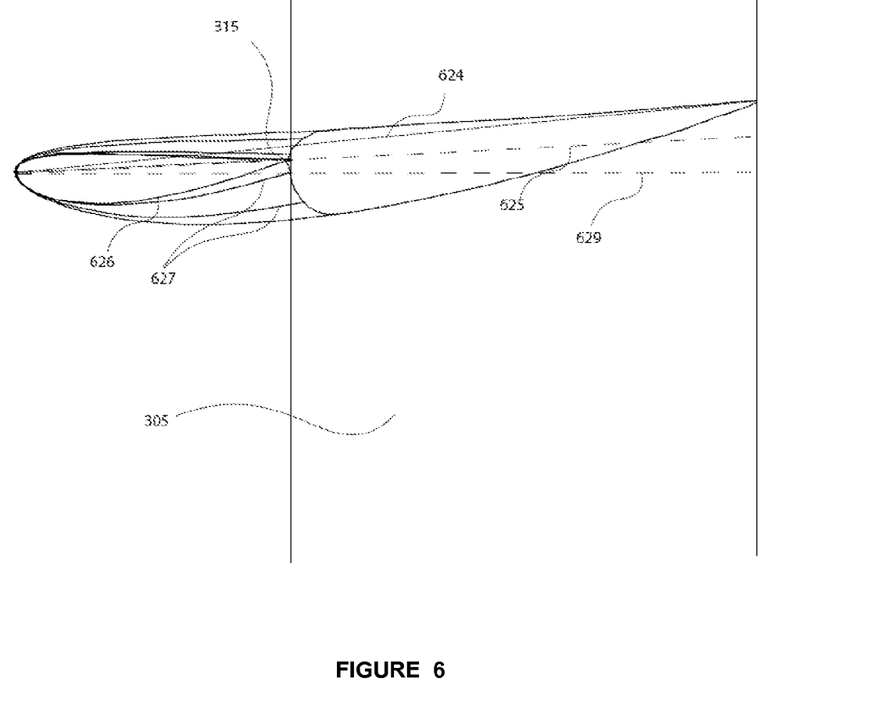
FIG. 6 illustrates pylon airfoil cross-sections according to some embodiments of the present invention.

FIG. 6 is a diagram depicting the cross-sections and alignment of components of an embodiment of a motor pylon. The chord line 624 of the lower pylon, and the chord line 625 of the upper pylon are depicted. The chord line 624 of the lower pylon is inclined 6 degrees from the mean chord direction 629 or x body axis of main wing 605, and the chord line 625 of the upper pylon is inclined 3 degrees from the mean chord direction 629 or x body axis of the main wing 305. This has the effect of reducing aerodynamic loading on the upper pylon such that the wake from the upper pylon incident on the top surface of the main wing 305 is weaker, and has less effect on the maximum coefficient of lift of the main wing 305. The lower pylon chord line 624 is at a greater angle relative to the main wing 605 such that the lower pylon generates greater aerodynamic loads creating a larger side-force on the kite (e.g. kite 101), providing acceleration to turn the kite along its flightpath (e.g. flightpath 104). The trailing edge of the bottom profile 626 of the upper pylon attaches to the main wing 605 at a trailing edge attachment point 615, which is also the foremost attachment point of the motor pylon to the main wing 305.

In some embodiments, the upper pylon profile 626 and the lower pylon profile 628 are symmetric sections. For example, in some embodiments, symmetric profiles might be used if the target flightpath is a figure eight for which the required direction of side force changes through the flightpath, or if the target flightpath is a large circle requiring a small sideforce to turn.

Figure 7:
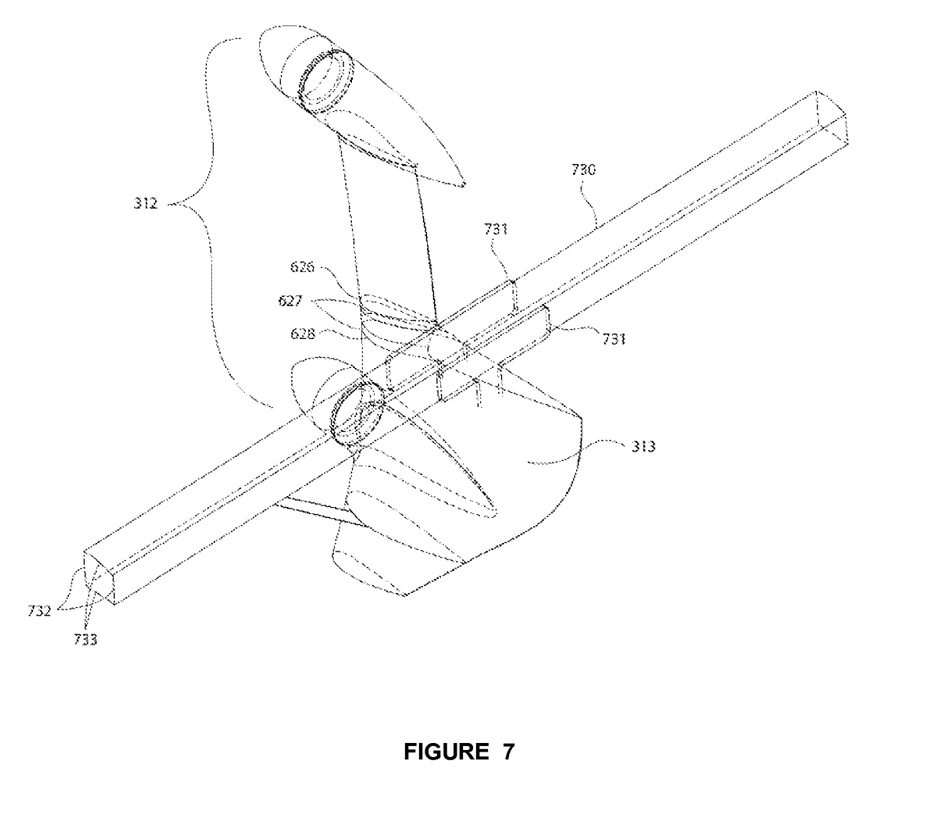
FIG. 7 illustrates pylon and wing spar structures according to some embodiments of the present invention.

FIG. 7 is a diagram depicting the internal structure of an embodiment of a motor pylon. In some embodiments, the main wing is constructed using a box type spar, in which at least two shear walls 732 connect two spar caps 733. In these embodiments, it is desirable to attach the motor pylon 312 to the main spar 730 of the wing by way of bonded, riveted, or bolted shear interface plates 731. The shear interface plates 731 attach to the front and back of the shear walls 732, as well as to the spars or internal structure of the pylon 712. In some embodiments, the main wing spar 730 is formed of carbon fiber, fiberglass, Kevlar, or another composite material through a bladder molding process, as a single component. In some embodiments, the shear interface plates 731 are co-molded of composite materials with the main spars of the lower pylon 313. In some embodiments, the shear interface plates 731 are made of aluminum or some other metal, and are bonded or riveted to the shear walls of the main wing spar 730. In a preferred embodiment, the main wing spar 730 is formed by a bladder molding process as a single completed piece and the shear wall interface plates 731 comprise the top ends of spars reinforcing the lower pylon 313.

Figure 8:
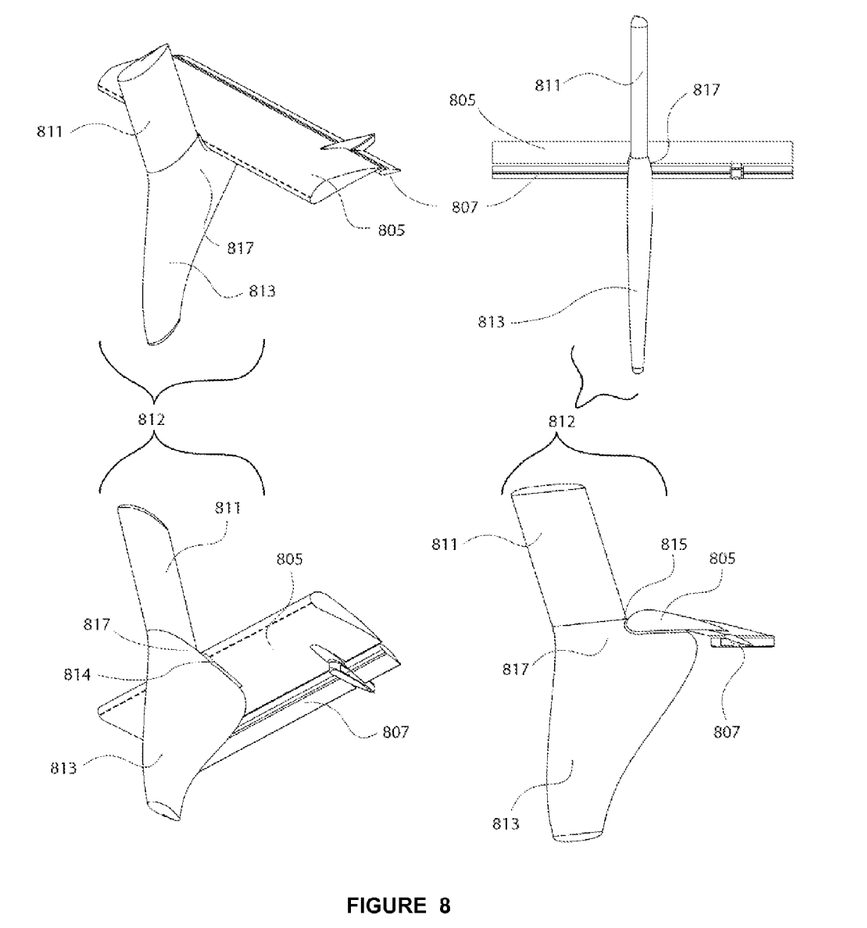
FIG. 8 illustrates lower pylon geometries according to some embodiments of the present invention.

FIG. 8 is a diagram depicting an embodiment of a motor pylon 812, the manner in which it is affixed to a main wing 805 and the attachment of the upper pylon 811 to the lower pylon 813. As the main wing 805 is operated a at a high coefficient of lift, it is designed with a specific distribution of pressure along the chord of the wing 805 such that lift remains high, drag remains low, and the wing 805 does not prematurely stall. As the coefficient of pressure over the surface of the wing 805 derives from the shape of the wing 805, modifications of the wing 805 have the potential to change the pressure distribution and affect stall. Furthermore, as the coefficient of lift of the wing 805 is high (e.g. above 0.7 as referenced to the planform area of the wing 805), air on the bottom surface of the wing 805 is moving slowly and has a lesser effect on the pressure distribution about the wing 805 due to shape changes. Thus, lower pylon 813 is affixed to the lower surface 814 of the main wing 805, and the upper pylon 811 is affixed to the leading portion of the lower pylon 813, such that the trailing edge of the upper pylon 811 ends ahead of or within close proximity to the stagnation point of the main wing 821.

In the depicted embodiment, the attachment of the lower pylon 813 to the main wing 805 is smoothly filleted through the pylon to wing attachment 814. As air on the bottom surface of the main wing 805 is already moving slowly due to the high lift design, the presence of sharp corners can lead to the creation of thickened boundary layers due to the retarding effect of two walls in close proximity. This thick boundary layer and accompanying slow airflow are highly susceptible to separation when exposed to even a small adverse pressure gradient as can be experienced over the trailing edge of high lift devices 807. Thus the smooth pylon 813 to main wing 805 junction 814 reduces the chances of flow separation over the trailing edge devices 807. A smooth attachment point for the lower pylon 813 to the lower surface of the main wing 805 also smooths pressure distribution and thus delays tripping the airflow from laminar to turbulent, thereby reduces drag and delays the loss of attachment of flow over the trailing edge high-lift device 807 of the main wing 805.

In the depicted embodiment, the trailing edge of the lower pylon 813 curves outwards toward the trailing edge high-lift devices 807 before curving back inwards to the attachment point 814 on the lower surface of the main wing 805. In such embodiments, the extent of the curve back is sized such that the streamlines of airflow in the wake of the lower pylon 813 has a minimal lateral component at the stagnation point on the leading edge of the high lift device 807, thereby reducing spanwise flow on the trailing edge device 807 and associated drag and loss of capacity to generate lift. In some embodiments, the trailing edge of the lower pylon 813 may be extended even further back such that the trailing edge high lift device 807 may be supported directly by the lower pylon 813.

In some embodiments, the pylon 812 comprises asymmetric, cambered airfoils mounted at some angle of sideslip relative to the mean oncoming flow direction. In such cases, the aerodynamic force generated by pylons 812 produces a side force on the kite (e.g. kite 101), which accelerates the kite around its flightpath (e.g. flightpath 104). In the depicted embodiment, pylon 813 comprises an airfoil with thickness of 22 percent of local chord, and camber of four percent of local chord, and is rotated six degrees relative to the design oncoming flow case at the bottom of lower pylon 813, with thickness decreasing to 18 percent of local chord and rotation decreasing to 3 degrees relative to the design oncoming flow case near the attachment point of the lower pylon to the main wing 814. In such embodiments, the decrease in thickness to chord ratio of upper sections of the lower pylon 813 reduces profile drag while maintaining a uniform minimum thickness throughout the pylon for structural or other purposes (e.g. for electrical conduits). The upper pylon 811 is also cambered 4 percent of chord, but is only inclined 3 degrees from the typical oncoming flow. As a strong wake from the upper pylon 811 would impinge upon the upper surface of the wing 805 and effect flow attachment at that location, the upper pylon is both smaller in chord and inclined at a lower angle than the lower pylon 813, such that the upper pylon 811 contributes a smaller portion of the side force than the lower pylon 813. The upper part of the lower pylon 813 is also rotated to only 3 degrees, resulting in a weaker wake close to the main wing thus reducing the potential to impact the attachment of flow on the main wing 805.

In some embodiments, the upper pylon 811 and the lower pylon 813 may be swept forward, with the leading edge of the top of the upper pylon 811 and the leading edge of the bottom of the lower pylon 813 located further forward toward the normal flight direction than the leading edge of the sections of the respective pylons vertically proximal to the main wing 805. In such embodiments, the sweep allows the placement of motor/generators (e.g. 418) near the top of pylon 811 and the bottom of the lower pylon 813 while allowing their respective rotors to be well clear of the main wing 805 as well as allowing the kite (e.g. 101) center of gravity to rest further forward, aiding longitudinal static stability. By locating the rotors well above and below the main wing 805, and also in front of the main wing 805, the wake of the rotors does not interact with the boundary layer on the main wing, and the decreased pressure on the upper surface of the main wing does not significantly increase the flow velocity through the lower half of the upper rotors as compared to the upper half of the upper rotors. In the depicted and similar embodiments where the pylons generate aerodynamic sideforce, the sweep further promotes spanwise flow along the pylons from the top of the upper pylon 811 and the bottom of the lower pylon 813 towards the main wing 805, thus increasing local static pressure near the main wing stagnation point 821, thereby reducing adverse pressure gradient of the airflow over the top surface of the main wing, which reduces likelihood of flow separation, in turn increasing maximum lift capability of the main wing 805.

In the depicted embodiment, the lower pylon 813 is longer than the upper pylon 811. In such embodiments, a landing gear may be attached to the bottom of the lower pylon 813. In such embodiments, the lower pylon 813 may be swept in sections, with the lower section of the lower pylon 813 swept forward to a much lower degree than the upper section of the lower pylon 813, or not swept at all, or swept back relative to the rest of the lower pylon 813 to enable clearance for rotors associated with any motor/generators (e.g. 418) that may be mounted to the lower pylon 813.

In the depicted embodiment, the lines defining the leading and trailing edges of the pylon 812 are smooth and continuous curves, reducing occurrence of sharp shape transitions thereby reducing formation of regions of localized flow separation and reducing drag. In some embodiments, the top of the upper pylon 811 and/or the bottom of the lower pylon 813 may be capped by dome-shaped structures to prevent separated flow at the tips of the pylon 812. In some embodiments, other devices such as winglets or raked wingtips or wingtip fences may be used to cap the tips of the pylon 812.

In some embodiments, the junction between the lower pylon 813 and the upper pylon 811 near the main wing 805 is constructed with the high pressure surfaces of the lower pylon 813 and the upper pylon 811 more closely aligned than their respective low pressure or suction surfaces such that a portion of the airflow that has passed over the lower pylon 813 crosses upwards to flow over the top surface of the main wing 805. In the depicted embodiment, the junction between the lower pylon 813 and the upper pylon 811 further causes the portion of the wake of the lower pylon 813 that is flowing over the top surface of the main wing to flow at a small angle relative to the wake from the upper pylon 811. The forward swept angle of the pylons further sheds vorticity into the air behind the pylon 812 on the top surface of the main wing 805, re-energizing the boundary layer of the upper surface of the main wing 805 behind the pylon-wing junction, thus delaying onset of flow separation behind the pylon 812 to such time when the main wing 805 is at a higher angle of attack relative to the oncoming flow, thereby increasing maximum lift capability of the main wing 805.

In some embodiments the entire pylon 812 may be angled such that the junction between the upper pylon 811 and the lower pylon 813 is no longer horizontal with respect to the ground or the gravity vector of the Earth. In such embodiments, the angle between the spanwise vector of the pylon 812 and the spanwise vector of the main wing 805 is such that the pylon causes the least drag from the oncoming airflow at an angle of attack for the main wing 805 that the kite (e.g. 101) is most likely to employ during normal flight.

Figure 9:
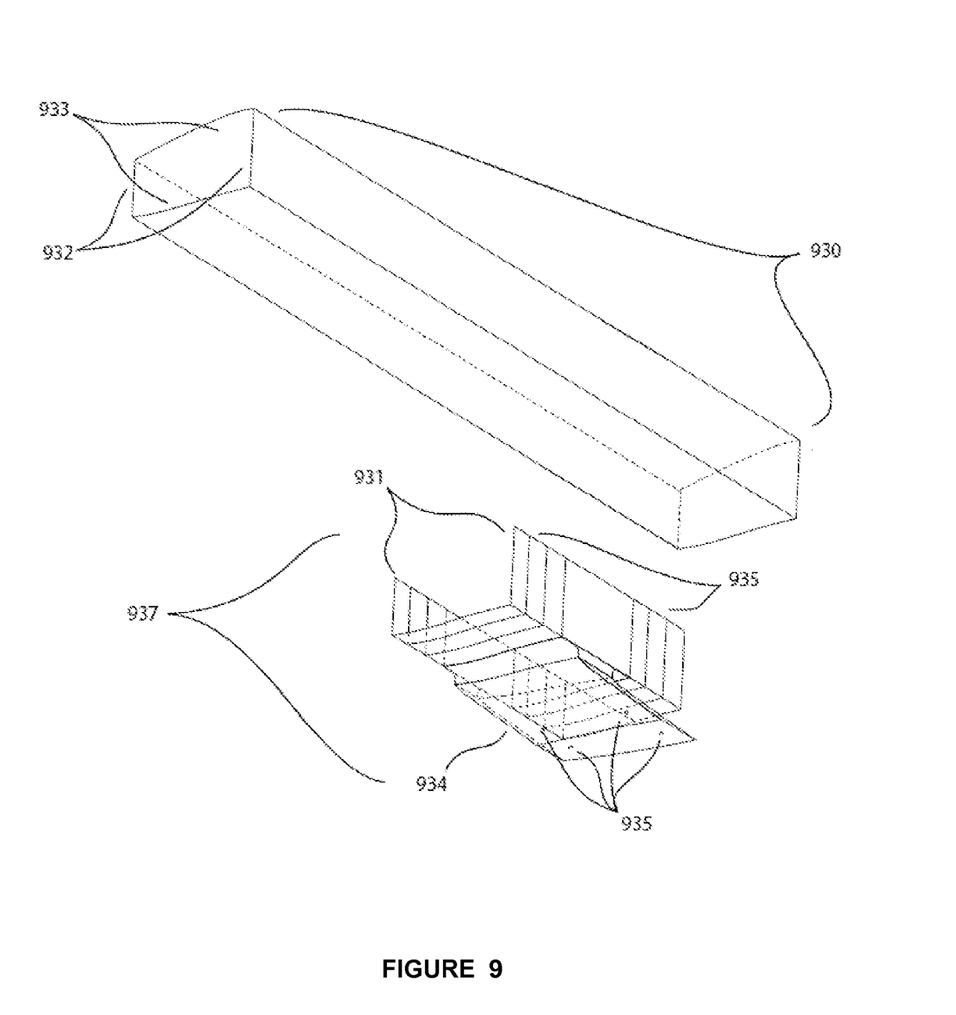
FIG. 9 illustrates a wing spar according to some embodiments of the present invention.

FIG. 9 is a diagram depicting an embodiment of the structural connection of a motor pylon for an airborne wind turbine main wing spar 930. In this embodiment, the motor pylon is attached to a glove 937 which is bonded to the shear walls of the main wing 932, and to a portion of main wing spar caps 933. The main wing spar 930 sees both large fore and aft bending moments, as well as large up and down bending moments. These combined yield large stresses on each face of the main wing spar caps 933 and the main wing shear walls 932 of varying amounts over time. The glove 937 bonds to the main wing spar spar 930 over a surface comprising a tapered laminate, with ply drops 935 reducing the thickness of the laminate over the length of the bond. The glove 937 further comprises a protrusion 934 which extends below the spar caps 933 in a planar manner from the shear walls 933 so as to transfer load in shear from pylon attachment points 935 in shear, through the shear walls of the glove 937, and further through the bond of the glove 937 to the shear walls 933 of the main wing spar 930. The pylon is attached by bolts or shear pins to the attachment points 935. This allows the pylon to be quickly attached or detached for transport, maintenance, or replacement. The glove 937 further bonds to the lower spar cap of the main wing spar 930. This connection is made through a curved segment 938, which prevents significant in-plane compression of extension from creating a peel force in the bond area, but does not prevent shear loads from being transferred, thereby preventing peeling forces from being transmitted into the shear interface places 931 from thrust or drag on the rotors on the pylons.

Figure 10:
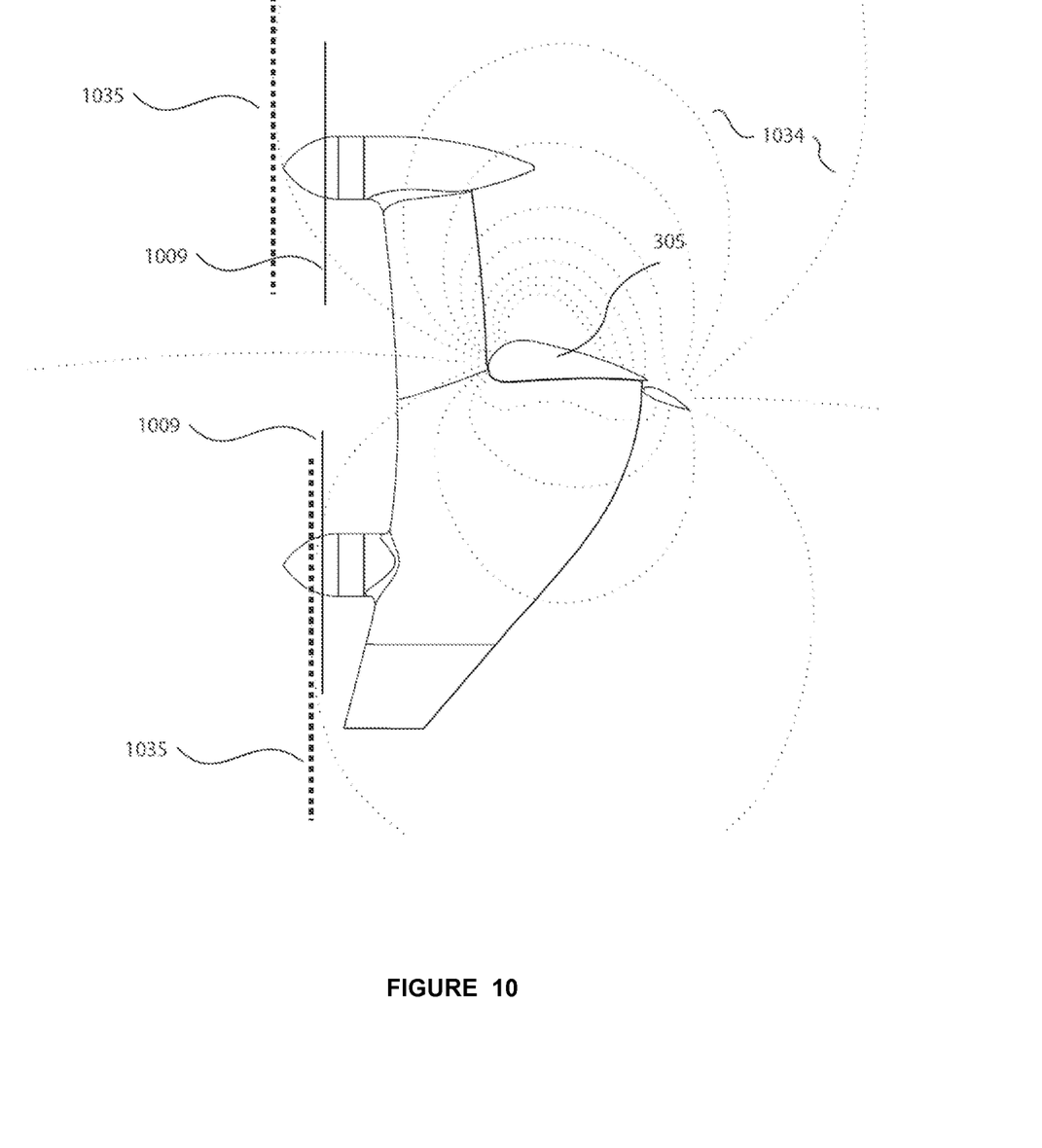
FIG. 10 is a side view of a pylon according to some embodiments of the present invention.

FIG. 10 is a diagram depicting an embodiment of a pylon substantially similar to that depicted in FIGS. 3, 4, 5, 6, and 7. The rotors 1009 are depicted by the disc or plane through which they rotate. A number of iso-pressure lines 1034 of the main wing 305 are depicted, along with the tangents 1035 of those iso-pressure lines most closely aligned with the rotors 1009. In many embodiments, the rotors 1009 are located such that the rotor discs are near tangent to the iso pressure lines in front of and above and below the main wing, such that the rotor discs do not intersect a significant number of iso-pressure lines or cross a significant range in incident flow velocities. The location of the rotors in front of and substantially above and below the main wing results in not only lower differential inflow velocity over various portions of the rotor disc, but also reduced impact of the rotor wake and expansion field on the main wing 305. Note that, in the drawing as depicted, the rotors would intersect five or more iso-pressure lines (equally spaced in differences of pressure) if located directly above or below the wing, while they intersect roughly 0.1-0.5 iso-pressure lines in their depicted configuration.

In some embodiments of the kite, the lifting surfaces are comprised of horizontal surfaces and vertical surfaces. In the presence of relative airflow, the horizontal surfaces produce lift on the pitch plane and the vertical surfaces produce a lifting force on the yaw plane, i.e., aerodynamic side-force. In various embodiments, a component of the lift generated by the horizontal surfaces is the primary motive force of kite. In some embodiments, the kite is rolled relative to the tether such that a component of the lift generated by the horizontal surfaces contributes to the turning force of the kite. In various embodiments, the lift generated by the vertical surfaces is the primary component of turning force of the kite. In high wind flight, the vertical surfaces are used instead of horizontal surfaces to generate the primary turning force, while the orientation of the kite is changed such that the coefficient of lift due to the horizontal surfaces is reduced. In this manner larger deviations in angle of attack may be tolerated on the horizontal surfaces prior to stall or spar failure. In some embodiments, the lifting surfaces are comprised of lifting surfaces in a number of different orientations that serve the same combined purpose of the vertical surfaces and the horizontal surfaces.

In some embodiments, the parasitic and induced drag of the horizontal surfaces and the vertical surfaces is determined by the trim angles of attack and side-slip of the kite and by the deflections of the control surfaces. In some embodiments, the drag from the horizontal surfaces and the vertical surfaces increases significantly at a range of side-slip angles that are large, which may be seen in high wind conditions, compared to the side-slip angles observed when the crosswind kite system operates in normal wind conditions. In some embodiments, the coefficient of lift of the horizontal surfaces decreases at a range of side-slip angles that are large compared to the side-slip angles observed when crosswind kite systems operate in normal wind conditions. In some embodiments, the aspect ratios of the vertical surfaces are small such that the vertical surfaces generate a large amount of induced drag when generating side-force. In some embodiments, the vertical surfaces are shaped to have a low span efficiency by comprising an irregular chord, span-wise gaps, span-wise slots, or alternating trailing edge deflections. In some embodiments, the vertical surfaces of the motor pylons have asymmetric airfoils such that the vertical surface is adapted for lift in one direction, which may be the center of a circular flight path in some aspects. In some embodiments, a subset of lifting surfaces comprise side-slip dependent lift modifiers, which modify the lift and drag of the surfaces which comprise them. In various embodiments, side-slip dependent lift modifiers comprise vortilators, fences, or any other appropriate lift modifiers. In some embodiments, the lift modifiers modify the stall characteristics of a subset of the lifting surfaces as a function of side-slip. In some embodiments, the vertical surfaces comprise through-wing vents or leading edge slats which see little airflow in normal operation but which exhibit a large through flow and a large drag coefficient at large side-slip angles. In some embodiments, the vertical surfaces comprise a subset of control surfaces that, when deflected or actuated, increase the side-force of vertical surfaces at a given angle of side-slip.

In some embodiments of the present invention, a pylon might comprise a NACA 2415 airfoil and have zero angle of incidence in normal power generating flight, producing a pylon coefficient of lift of 0.25. At an aspect ratio of 4 and span efficiency of 1, this results in a coefficient of induced drag, referenced to the pylon area alone, of 0.005. If, in high wind flight, the kite is flown at an average sideslip of 7 degrees, the pylons then generate a pylon-referenced coefficient of induced drag of 0.08. In some embodiments, the pylons have about 0.25 of the area of the main wing, resulting in an increase in coefficient of drag of 0.02 referenced to wing area. In some embodiments, the pylons are shaped in a manner which has a very low span efficiency. For instance, the pylons may incorporate large changes in chord over short pylon-spanwise distances, or may incorporate sharp edges near the pylon tips, oriented to be aligned with the flow at kite sideslips, but to be misaligned with the flow at high sideslips. For example, the tip of the pylon may be cut off with a square end. A pylon with a vertical pylon as described above offers an advantage in that induced drag is significantly increased when the kite is flown in sideslip. As the side slip angle is increased in flight in high winds, induced drag increases, moderating the increase in structural loading on the system due to the increase in wind speed.

The pylon airfoil profile may also be modified to produce greater profile drag above a critical angle of sideslip. For example, the pylon profile 1301 may incorporate a leading edge cuff over a portion of the span of the pylon, as depicted in FIG. 13. A cross-sectional profile 1301 of a segment of the pylon, may cover, for example, 20% of total pylon span. The pylon may have a leading edge cuff 1302 with a sharp curvature discontinuity, causing a separation bubble over a segment of the top surface of the pylon cross-section above a critical kite sideslip or critical angle of attack of the pylon cross-section relative to the apparent wind. As the majority of the pylon still utilizes a conventional airfoil cross-section, the added separation and parasitic drag due to the cuffed pylon segments does not dramatically affect stall angle of attack or kite handling. A pylon with profile features as described above offers an advantage in that profile drag is increased when the kite is flown at a significant sideslip angle. As the side slip angle is increased in flight in high winds, profile drag increases, moderating the increase in structural loading on the system due to the increase in wind speed.

The main airfoil, in some embodiments, has an aspect ratio of 25, and operates at a coefficient of lift of 2 in normal power generating flight, and a coefficient of lift of at or above 0.7 in high wind flight. To provide an example, this results in a coefficient of induced drag of between 0.085 and 0.05 referenced to wing area during normal crosswind flight, and a coefficient of induced drag of 0.006 at the low coefficient of lift used in high wind flight. In this example, assume the tether has a coefficient of drag referenced to wing area of 0.05, and a parasitic and profile drag of 0.04 referenced to wing area. This results in a lift to drag of 14 for the airframe, and a performance metric ($C\_L^3/C\_D^2$) of 400.

In high winds, again neglecting the effects of flightpath geometry, the resulting lift to drag ratio at a coefficient of lift of 0.7 on the main wing is 7, and the performance metric is 40. If, however the added pylon drag due to sideslip previously listed (0.01) and due to change in profile (0.01) are included, the lift to drag becomes 6, and the performance metric becomes 25. In the example given, continued flight of circles becomes difficult at a coefficient of lift of 1.5, due to the requirement for excessive tether roll angle in order to complete the turn (in turn due to the lower aerodynamic force available to counteract centripetal forces). If this is taken as the minimum coefficient of lift of a kite system not incorporating aspects of the present invention in its flight, including turning with side slip, the lift to drag and performance metric of the system are, respectively, 12.6 and 240. Aerodynamic forces increase roughly as the square on incoming windspeed. Thus, if the nominal flight example above uses full allowable flight-loads (20000 Newtons for an 4 square meter wing, for example) in winds of 10 m/s, the example with a minimum coefficient of lift of 1.5 is able to fly in winds no higher than 13 m/s, and the example incorporating multiple aspects of the present invention, with a minimum coefficient of lift of 0.7, is able to flight in winds no higher than 39 m/s. Although in practice embodiments of the present invention may utilize additional features to moderate loads in high wind conditions, one can see that just this aspect allows for a 290% increase in wind capability versus just 30% without this aspect in this exemplary embodiment.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A motor pylon system for use on a high lift rigid flying device, said motor pylon system comprising:
   a main wing, wherein said main wing includes a leading edge and a trailing edge; and
   one or more motor pylons, said motor pylons comprising:
      a lower pylon; and
      an upper pylon, wherein said lower pylon is attached to a lower surface of said main wing and a trailing edge of said lower pylon extends beyond said leading edge of said main wing, and wherein said upper pylon is attached primarily to said lower pylon and wherein a trailing edge of said upper pylon meets said main wing at said leading edge of said main wing.

2. The motor pylon system of claim 1 wherein each of said one or more motor pylons comprise:
   a first turbine driven generator attached to said upper pylon; and
   a second turbine driven generator attached to said lower pylon.

3. The motor pylon system of claim 2 wherein said main wing is part of a tethered kite system.

4. The motor pylon system of claim 2 wherein said upper and lower pylons are swept forward.

5. The motor pylon system of claim 2 wherein a blend between the upper and lower pylon is contoured along a mean flow within a flow field around the main wing.

6. The motor pylon system of claim 2 wherein the lower pylon of said one or more motor pylons supports a trailing element or flap of said main wing.

7. The motor pylon system of claim 1 wherein said upper pylon comprises a first vertical airfoil element and wherein said lower pylon comprises a second vertical airfoil element.

8. The motor pylon system of claim 7 wherein said first vertical airfoil element is mounted at an angle such that said first vertical airfoil element generates a side force in a first direction when air flows over said main wing.

9. The motor pylon system of claim 8 wherein said second vertical airfoil element is mounted at an angle such that said second vertical airfoil element generates a side force in said first direction when air flows over said main wing.

10. The motor pylon system of claim 9 wherein said upper and lower pylons are swept forward.

11. The motor pylon system of claim 1 wherein the trailing edge of the upper pylon meets or blends into the main wing at a point near a stagnation point of an unperturbed segment of the main wing.

12. The motor pylon system of claim 1 wherein said upper and lower pylons are swept forward.

13. The motor pylon system of claim 1 wherein said main wing comprises a box-type spar, and wherein said motor pylons are attached to said main wing with shear plates bonded to a shear wall of the box-type spar.

14. The motor pylon system of claim 13 wherein said box-type spar is of single-piece construction.

15. The motor pylon system of claim 1, wherein said trailing edge of said lower pylon extends to said trailing edge of said main wing.

16. The motor pylon system of claim 1, wherein said trailing edge of said lower pylon extends beyond said trailing edge of said upper pylon.

17. The motor pylon system of claim 1 wherein said trailing edge of said upper pylon ends ahead of a stagnation point of said main wing.

18. The motor pylon system of claim 1 wherein said trailing edge of said lower pylon curves outwards toward said trailing edge of said main wing before curving back inwards to an attachment point on said lower surface of said main wing.

19. The motor pylon system of claim 1, wherein said upper pylon is thinner than said lower pylon, and a junction between said upper pylon and said lower pylon tapers to a smaller width from said lower pylon to said upper pylon.

20. The motor pylon system of claim 1, wherein said lower pylon is longer than said upper pylon.

* * * * *